United States Patent [19]

Betts

[11] 4,414,709

[45] Nov. 15, 1983

[54] SHRIMP PROCESSING MACHINE HAVING IMPROVED CUTTING STRUCTURE

[75] Inventor: E. Douglas Betts, Libertyville, Ill.

[73] Assignee: Gregor Jonsson Associates, Inc., Highland Park, Ill.

[21] Appl. No.: 296,573

[22] Filed: Aug. 26, 1981

[51] Int. Cl.³ .................................................. A22C 29/02
[52] U.S. Cl. ........................................................... 17/71
[58] Field of Search ................................... 17/71, 72, 73

[56] References Cited

U.S. PATENT DOCUMENTS

| | | | |
|---|---|---|---|
| 2,301,729 | 11/1942 | Krull | 17/72 |
| 2,784,450 | 3/1957 | Jonsson | 17/72 X |
| 3,698,038 | 10/1972 | Jones, Jr. | 17/71 |
| 3,867,740 | 2/1975 | Lapine et al. | 17/72 |

Primary Examiner—Willie G. Abercrombie

Attorney, Agent, or Firm—Merriam, Marshall & Bicknell

[57] ABSTRACT

There is disclosed a shrimp processing machine of a type which includes a plurality of processing stations. One of the processing stations is a cutting station having a rotary blade for cutting the shrimp lengthwise. The machine also includes a carrier for gripping the shrimp and transferring the shrimp seriatim through the processing stations. The carrier includes a plurality of clamps for gripping the shrimp, wherein each clamp has a pair of spaced apart opposed structures defining an elongate space therebetween and a backup or intervening structure arranged to be received within the elongate space for coacting with the opposed structures to grip the shrimp. The intervening structures include an elongate slot arranged to be adjacent the shrimp for allowing the rotary blade to enter the slot through the shrimp for cutting the shrimp entirely therethrough.

11 Claims, 5 Drawing Figures

U.S. Patent  Nov. 15, 1983  4,414,709
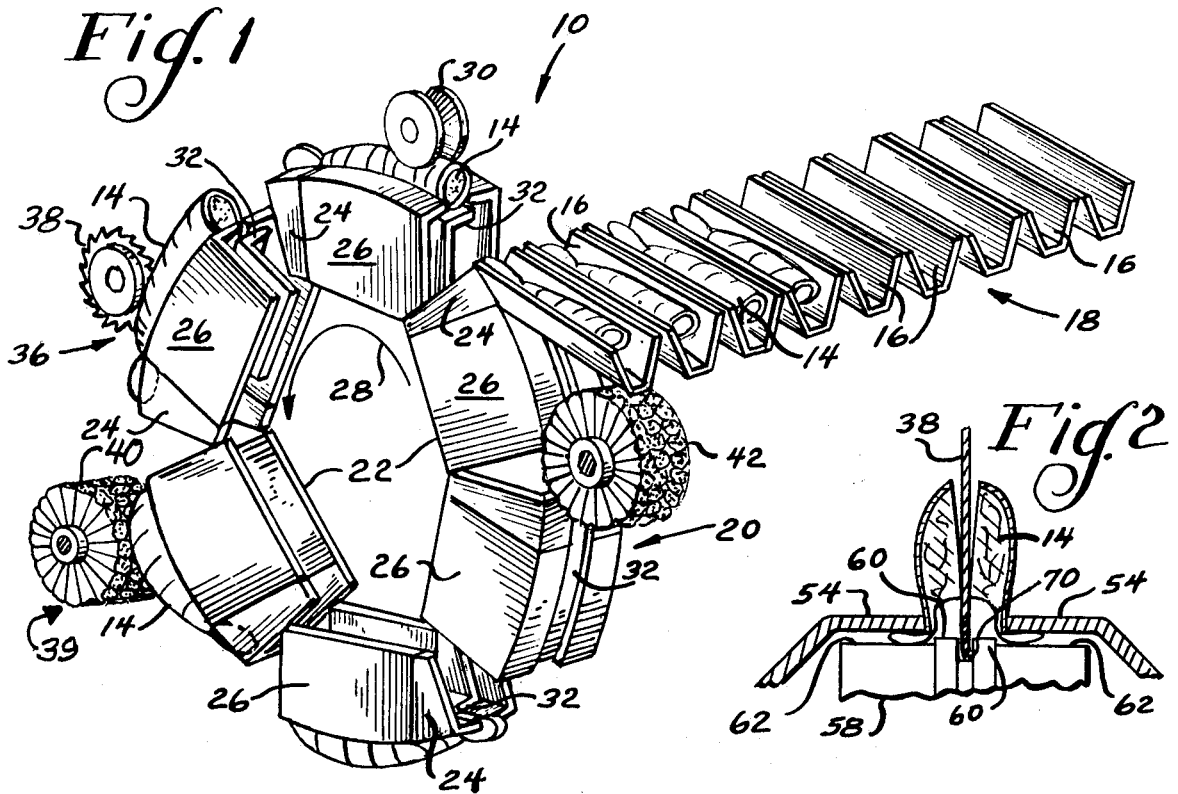
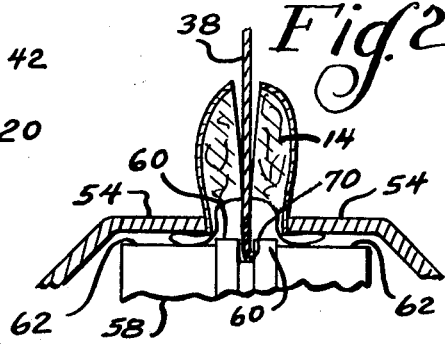
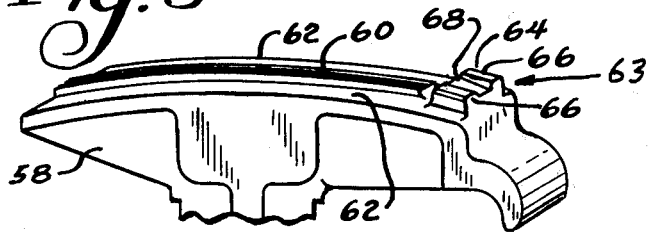
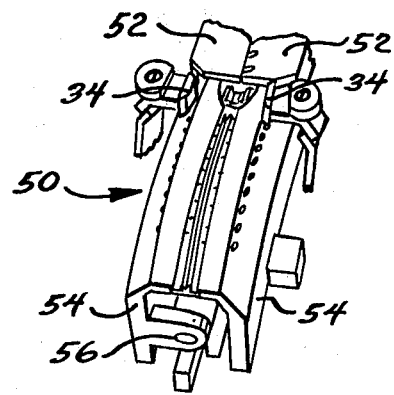
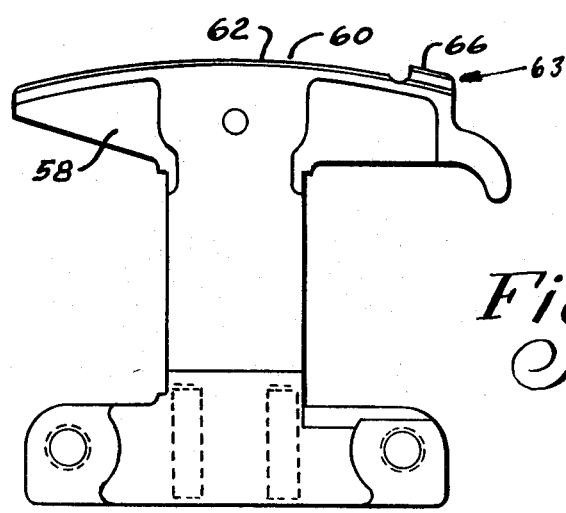

SHRIMP PROCESSING MACHINE HAVING IMPROVED CUTTING STRUCTURE

BACKGROUND OF THE INVENTION

The present invention is generally directed to the processing of food. A shrimp is covered with a shell and contains an inedible sand vein near its back. This vein must be removed before a shrimp is canned, frozen or cooked. It further is generally desirable to remove the shrimp meat from the shell, although occasionally it may be desirable to leave the meat in the shell.

Hand removal of veins and hand shelling is tedious and inefficient and consequently is most undesirable when large numbers of shrimp must be handled. Early methods and machines developed for removing the veins from the shrimp and separating the meat and shells have not been entirely successful in producing a large yield of clean meat, or else have required a great amount of hand work. More specifically, the early machines did not completely remove the vein or caused too much meat to be removed adjacent the vein while allowing much of the meat to be left clinging to the shell.

In order to overcome the deficiencies of the aforementioned early machines, shrimp processing machines of the type fully described in U.S. Pat. Nos. 2,850,761 and 3,159,871 were developed. These machines included a plurality of processing stations and a carrier for transferring the shrimp through the processing stations. One station was arranged to cut the shrimp lengthwise along its back to expose the sand vein, another station removed the sand vein of the shrimp, and still another station automatically separated the shrimp meat from the shell. While the machines described in the aforementioned U.S. Pat. Nos. 2,850,761 and 3,159,871 provided a more than adequate solution to existing problems in such machines at that time, further refinements were left to be made. For example, there are types of processing such as, Western or Cowboy split wherein it is necessary to cut entirely through the shrimp lengthwise prior to the preparation thereof for consumption. Prior art machines did not provide for this form of lengthwise cutting of the shrimp. The machines referred to above merely cut part way through the shrimp to a sufficient depth so as to remove the sand vein therefrom but not entirely through the shrimp.

It is therefore a general object of the present invention to provide a new and improved shrimp processing machine.

It is a more specific object of the present invention to provide a shrimp processing machine which includes a cutting station which is arranged to cut the shrimp lengthwise entirely therethrough.

It is a further object of the present invention to provide a shrimp processing machine which includes a plurality of processing stations including a cutting station having a rotary blade for cutting the shrimp and a means for transferring the shrimp seriatim from one processing station to another which allows the rotary blade to cut the shrimp lengthwise and entirely therethrough.

SUMMARY OF THE INVENTION

The invention provides a shrimp processing machine including a plurality of processing stations including a cutting station having a rotary blade means for cutting the shrimp lengthwise. The machine further includes a carrier means for gripping the shrimp and transferring the shrimp seriatim through the processing stations. The carrier means includes a plurality of clamps for gripping the shrimp wherein each clamp has a pair of spaced apart structures defining an elongate space therebetween and an intervening structure arranged to be received within the elongate space for co-acting with the opposed structures for gripping the shrimp. The intervening structures include an elongate slot arranged to be adjacent the shrimp for allowing the rotary blade means to enter the slot for cutting the shrimp entirely therethrough.

BRIEF DESCRIPTION OF THE DRAWINGS

The features of the present invention which are believed to be novel are set forth with particularity in the appended claims. The invention, together with further advantages and objects thereof, may best be understood by making reference to the following description taken in conjunction with the accompanying drawings, in the several figures of which like reference numerals identify identical elements, and wherein:

FIG. 1 is a perspective view, partially in schematic form, illustrating a prior art shrimp processing machine which may advantageously utilize the shrimp cutting process station of the present invention;

FIG. 2 is a partial cross sectional view of a shrimp cutting process station embodying the present invention;

FIG. 3 is a partial perspective view of an intervening structure which forms a part of the shrimp cutting process station embodying the present invention;

FIG. 4 is a side plan view of the intervening structure of FIG. 3; and

FIG. 5 is a partial perspective view of the shrimp cutting process station of FIG. 2 embodying the present invention.

DESCRIPTION OF THE PREFERRED EMBODIMENT

Referring now to FIG. 1, there is shown in partial schematic form a prior art shrimp processing machine which may utilize the shrimp cutting process station of the present invention to advantage. To obtain a more detailed illustration and description of such a machine as illustrated in FIG. 1, reference may be had to the aforementioned U.S. Pat. Nos. 2,850,761, and 3,159,871 which patents are incorporated herein by reference.

The shrimp processing machine 10 thereshown includes a plurality of trays 16 of a loading conveyor 18 into which the shrimps are manually loaded. The loading conveyor 18 is intermittently operable and is stationary while the shrimp are manually loaded into it. The shrimps are loaded into the trays 16 so that the tails of the shrimp project outwardly therefrom. The conveyor 18 passes over a disc conveyor or carrier 20. The carrier 20 comprises a plurality of sets of clamps 22. The carrier 20 and trays 16 are operated in timed relation for loading shrimp onto the carrier 20.

Each set of clamps 22 comprises a tail clamp 24 and a body clamp 26. The direction of rotation of the carrier 20 is indicated by the arrow 28 and is such that the tail clamps 24 lead the body clamps 26. As the clamp sets ascend beneath the conveyor trays 16, the clamp sets are opened by cams (not shown). Each tail clamp 24 closes opposite a conveyor tray 16, the loading conveyor being stationary at the time, to clamp the tail of a shrimp thereby to pull the shrimp from the conveyor tray. The bodies of the shrimp 14 are straightened so that they are aligned with the elongated space defined by the opposing structures of the body clamps 26. The shrimp bodies are pushed down part way into this elongated space by a grooved roller 30 against a back-up plate 32, whereupon the body clamps 26 are spring closed. The underside or belly of a shrimp is provided with a number of appendages and is rather soft. The underside or belly is thereby pinched or clamped between the clamps 26.

Continued rotation of the carrier 20 carries each shrimp past a disjointing station or zone (see station 40 in U.S. Pat. No. 3,751,766) wherein the shell of the shrimp is disjointed by opposed longitudinal forces applied to the shrimp by clutch jaws 34 as described in U.S. Pat. No. 3,751,766.

Continued rotation of carrier 20 transfers the shrimp from the disjointing section to a cutting station 36 which includes a rotary blade or rotating knife 38. The rotary blade 38 simultaneously slits the shell of the shrimp down the backs thereof and at the same time cuts slightly into the meat to pull out the sand vein. The pinching of the belly of the shrimp between the body clamps 26 causes the shell to spread apart along the slit as soon as it is cut by the rotary blade 38.

From the cutting station 36 each shrimp is carried to a debris removing station 39 where the open dorsal side of the shrimp is scrubbed by a rotary brush 40, preferably aided by a jet of water (not shown here, but see nozzle 202 in U.S. Pat. No. 3,214,789) to remove all of the debris and leave the shrimp clean.

Continued rotation of the carrier 20 brings each shrimp into position above a meat separating mechanism (not shown). The meat separating mechanism, as clearly shown and described in the aforementioned referenced patents, comprises a perforated strip or plate beneath which is positioned a plate carrying a plurality of spikes. The spikes periodically move up in timed relation to the movement of the carrier and at a very rapid rate to penetrate the meat without tearing the meat. The carrier 20 then moves with the meat impaled on the spikes so that the body clamps 26 pull the shell longitudinally away from the meat. The spikes are then retracted and the stripper plate pulls the meat from the spikes. A water spray then sprays across the top of the stripper plate to push the meat of the shrimp from the side of the stripper plate for collection.

A rotating brush 42 is positioned adjacent the periphery of the carrier 20 for cleaning the clamps. Debris falling from the clamps, and also water from within the machine are caught in a tray (not shown) beneath the machine.

As previously mentioned, the rotary blade 38 at the cutting process station only cuts slightly into the meat by an amount sufficient to remove the inedible sand vein. The rotary blade 38 is not allowed to cut entirely through the shrimp because of the presence of the back-up plate 32. Should complete cutting of the shrimp be attempted with this structure, the rotary blade 38 would contact the back-up plate 32 and be damaged. Hence, to process shrimp of the aforementioned Western or Cowboy split style a substitute structure is necessary. The present invention as will be described hereinafter with reference to FIGS. 2 through 5 provides such structure to enable the processing of Western or Cowboy split. More specifically, the shrimp cutting process station to be described hereinafter allows the rotary blade 38 to cut entirely through the shrimp while avoiding damage to the rotary blade 38 and other component parts of the machine.

Referring now to FIGS. 2 through 5, it can be seen that the shrimp processing machine contemplated by the present invention includes clamp sets 50 for the carrier 20 which has a first set of tail clamps 52 for gripping the tails of the shrimp, and a second set of body clamps 54' for gripping the bodies of the shrimp. Body clamps 54' are arranged for pivotal movement at 56 to facilitate the opening and closing of the clamps 54'.

As can be seen in FIG. 2, body clamps 54', when closed, comprise a pair of spaced apart opposed clamp structures or arms 54 defining an elongated space therebetween. The carrier clamps 50 also include a shrimp support member or intervening structure 58 which, as can be seen in FIGS. 3 and 4, is generally anvil shaped in configuration. The intervening structure or support 58 includes a curved first pedestal or raised portion 60, FIGS. 2–5, which is dimensioned to be positioned in close proximity to the elongated space between the opposed clamp arms 54. Shrimp support member 58 further includes a pair of shoulders 62 which are arranged to lie beneath and contiguous to the under surfaces of the clamp arms 54. Hence, when a shrimp 14 is directed or pushed downwardly by arms 54 into the elongated space defined by the clamp arms 54, it will rest on the shrimp support member 58 and clamps 54' will coact to grip the shrimp in a manner as shown in FIG. 2.

A tail deflecting element has previously been found to be highly advantageous (see e.g., U.S. Pat. No. 3,122,777, Column 5, Line 55–Column 6, Line 29). In accordance with the present invention a raised tail deflecting section 63 has been found to be more efficacious. In the present invention the shrimp support member 58 includes a second pedestal 61 disposed above and spaced from the first pedestal 60. Second pedestal 61 includes a leading portion 64 comprising a pair of rails 66 which are raised in relation to the first pedestal 60. A descending recess 68 is provided between rails 66 and serves to coact with the rails 66 to position the tail of a shrimp after it is gripped by tail clamps 52.

Within the first pedestal 60 of the intervening structure 58 there is an elongated groove 70. Groove 70 may be of any desired cross section and preferably is a rectangular cross section as shown in FIG. 2. Groove 70 is provided with a sufficient depth so that the rotary blade 38 may enter groove 70 whereby shrimp 14 may be cut lengthwise entirely therethrough as shown in FIG. 2. Because groove 70 is arranged to be closely adjacent to the body of shrimp 14, and because the body of shrimp 14 is forced into position by the rollers 30, it is assured that blade 38 will cut entirely through the shrimp as shown.

Lastly, as shown in FIG. 5, the clutch jaws 34 are shown in retracted position. The clutch jaws 34 serve to restrain and thus to stretch the shell of the shrimp adjacent to the tail portion. Also, as fully described in the aforementioned referenced patents, rotary blade 38 may be arranged for reciprocal movement into and out of the shrimp. Preferably, the rotary blade 38 is caused to move into the shrimp after the tail portion of the shrimp has passed thereby so that only the body of the shrimp is cut entirely therethrough.

From the foregoing, it can be seen that the present invention provides a new and improved shrimp processing machine. The shrimp processing machine contemplated by the present invention not only provides all of the previously known process steps for cleaning shrimp, but additionally, provides a means by which Western or Cowboy split style shrimp may be processed. More specifically, the present invention provides a shrimp processing machine which allows the bodies of the shrimp to be cut entirely therethrough to afford preparation and ultimate consumption of Western or Cowboy split style shrimp. Because of the elongated groove 70 within the pedestal 60 of the intervening structure 58, the rotary blade 38 is allowed to pass entirely through the shrimp and into the groove 70 to avoid damage to the blade and other components of the machine.

While a particular embodiment of the present invention has been shown and described, modifications may be made, and it is therefore intended to cover all such changes and modifications as fall within the true spirit and scope of the invention.

The invention is claimed as follows:

1. A shrimp processing machine comprising:
   a plurality of processing stations including a cutting station having a rotary blade means for cutting the shrimp lengthwise, and carrier means for gripping the shrimp and transferring the shrimp seriatim through said processing stations,
   said carrier means including a plurality of clamp sets for gripping the tail and body of a shrimp, each body clamp having a pair of spaced clamp arms defining an elongated space therebetween, a shrimp support member disposed contiguous to said elongated space for coacting with said clamp arms for gripping the shrimp,
   said support member including a first pedestal having a groove therein,
   said groove being aligned with said cutting blade for allowing said rotary blade means to enter said groove for cutting entirely through a shrimp disposed on said support member.

2. A machine as defined in claim 1 wherein each of said clamp arms includes an undersurface and said support member includes a shoulder portion located adjacent each side of said pedestal, each of said shoulder portions being arranged to be contiguous to said corresponding undersurface for gripping the shrimp therebetween.

3. A machine as defined in claim 2 wherein said elongated groove is substantially rectangular in cross section.

4. A machine as defined in claim 1 wherein each tail clamp comprises a pair of opposed clamp arms for gripping the tail of the shrimp and each body clamp includes spaced clamp arms for gripping the body of a shrimp between the clamp arms.

5. A shrimp processing machine comprising:
   a plurality of shrimp processing stations arranged along a circular path; carrier means for gripping the shrimp and transferring the shrimp along said circular path in seriatim through said processing stations,
   said carrier means including a plurality of clamp sets, each clamp set including a pair of spaced apart clamp arms defining an elongated space therebetween and a shrimp support member having a first pedestal dimensioned to be positioned in close proximity to said elongated space for coacting with said clamp arms for gripping the shrimp and an elongated groove within said pedestal and arranged to be adjacent a shrimp body disposed on said support member; and,
   a rotary blade at one of said processing stations, said rotary blade being adapted to cut the shrimp lengthwise and to enter said groove for cutting a shrimp disposed on said support member entirely therethrough.

6. A machine in accordance with claim 5 wherein said shrimp support member further includes a second pedestal spaced from and normally positioned above said first pedestal for supporting the tail of a shrimp.

7. A machine in accordance with claim 6 wherein said second pedestal includes a pair of spaced rails and a recess disposed between the rails.

8. A machine in accordance with claim 7 wherein said recess section of said second pedestal is tapered downwardly from a leading portion of the second pedestal.

9. A shrimp support member adapted for use with a shrimp processing machine, said support member comprising a first pedestal member having an elongated groove formed therein and a shoulder portion disposed on each side of said first pedestal.

10. A shrimp support member in accordance with claim 9 wherein said groove is of a depth which extends deeper than the surface of said shoulder portion.

11. A shrimp support member in accordance with claim 10 wherein said support member further includes a second pedestal spaced from and raised higher than said first pedestal for receiving the tail of a shrimp, said second pedestal having a pair of spaced rails and a tapered recess located between said rails.

* * * * *